United States Patent
Pi et al.

(10) Patent No.: US 9,100,897 B2
(45) Date of Patent: Aug. 4, 2015

(54) SYSTEM AND METHOD FOR EFFICIENT STATION IDENTIFICATION

(75) Inventors: Zhouyue Pi, Allen, TX (US); Sudhir Ramakrishna, Plano, TX (US); Kaushik Josiam, Dallas, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1001 days.

(21) Appl. No.: 12/951,952

(22) Filed: Nov. 22, 2010

(65) Prior Publication Data

US 2011/0170480 A1 Jul. 14, 2011

Related U.S. Application Data

(60) Provisional application No. 61/294,368, filed on Jan. 12, 2010.

(51) Int. Cl.
*H04W 4/00* (2009.01)
*H04W 48/12* (2009.01)
*H04W 88/08* (2009.01)

(52) U.S. Cl.
CPC .............. *H04W 48/12* (2013.01); *H04W 88/08* (2013.01)

(58) Field of Classification Search
CPC .............................. H04W 28/04; H04L 1/0083
USPC .................................................. 370/328, 329
See application file for complete search history.

(56) References Cited

U.S. PATENT DOCUMENTS

| 2006/0028976 A1 | 2/2006 | Park et al. | |
| 2006/0209870 A1* | 9/2006 | Lee et al. | 370/432 |
| 2006/0245472 A1 | 11/2006 | Pan et al. | |
| 2006/0291372 A1 | 12/2006 | Koo et al. | |
| 2009/0103487 A1* | 4/2009 | Oh et al. | 370/329 |
| 2009/0176463 A1 | 7/2009 | Raaf et al. | |
| 2010/0251083 A1* | 9/2010 | Cho et al. | 714/807 |
| 2011/0103323 A1* | 5/2011 | Wang et al. | 370/329 |
| 2011/0205997 A1* | 8/2011 | Chun et al. | 370/329 |
| 2011/0222499 A1* | 9/2011 | Park et al. | 370/329 |

FOREIGN PATENT DOCUMENTS

WO    WO 2009/058059 A1    5/2009

OTHER PUBLICATIONS

International Search Report dated Sep. 27, 2011 in connection with International Patent Application No. PCT/KR2011/000211.
Written Opinion of the International Searching Authority dated Sep. 27, 2011 in connection with International Patent Application No. PCT/KR2011/000211.

* cited by examiner

*Primary Examiner* — Michael Thier
*Assistant Examiner* — Feben M Haile

(57) ABSTRACT

A base station is provided. The base station includes a transmit path circuitry that generates a masking sequence to mask a cyclic redundancy check of a control channel information element. The masking sequence includes a 4-bit prefix. The three least significant bits of the 4-bit prefix indicate a message type of the control channel information element. A subscriber station is also provided. The subscriber station includes a receive path circuitry that determines a message type of a control channel information element using a three least significant bits of a 4-bit prefix of a masking sequence used to mask a cyclic redundancy check of the control channel information element.

12 Claims, 5 Drawing Sheets

FIG. 4

| DECIMAL VALUE * | DESCRIPTION |
| --- | --- |
| 0-4055 | STATION ID |
| 4056 | BROADCAST ID USED TO IDENTIFY BROADCAST ASSIGNMENT A-MAP IE |
| 4057 | USED TO IDENTIFY BR-ACK A-MAP IE |
| 4058-4089 | USED TO IDENTIFY GRA A-MAP IE, AND IS DIRECTLY MAPPED TO 5 BIT GROUP ID |

*6 INDEXES FROM 4095 TO 6095 ARE RESERVED FOR MSTID IN E-MBS

FIG. 5

| MASKING PREFIX | DESCRIPTION |
| --- | --- |
| 0B0 | CRC IS MASKED BY 1 BIT MASKING PREFIX, 3 BIT ZERO PADDING, AND 12 BIT MASKING ID (i.e 0000|MASKING ID) |
| 0B1 | CRC IS MASKED BY 1 BIT MASKING PREFIX, AND 15 BIT RAID (i.e 1|RAID) |

FIG. 6

| MASKING PREFIX | DESCRIPTION |
|---|---|
| 0B0 | CRC IS MASKED BY 1 BIT MASKING PREFIX, 3 BIT MESSAGE TYPE INDICATOR ZERO PADDING, AND 12 BIT MASKING ID (i.e 0000\|MASKINGID)<br>THE 3-BIT MESSAGE TYPE INDICATOR SHALL BE SET/INTERPRETED AS FOLLOWS.<br>000: 12 BIT MASKING ID REFERS TO A UNICAST STATIONID (CRC MASK = 0000\|MASKINGID)<br>001: 12 BIT MASKING ID REFERS TO A GROUP STATIONID (CRC MASK = 0001\|MASKINGID)<br>010: 12 BIT MASKING ID REFERS TO A BROADCAST STATIONID (CRC MASK = 0010\|MASKINGID)<br>011: 12 BIT MASKING ID REFERS TO AN EMBS STATIONID (CRC MASK = 0011\|MASKINGID) |
| 0B1 | CRC IS MASKED BY 1 BIT MASKING PREFIX, AND 15 BIT RAID (i.e,1\|RAID) |

SYSTEM AND METHOD FOR EFFICIENT STATION IDENTIFICATION

CROSS-REFERENCE TO RELATED APPLICATION(S) AND CLAIM OF PRIORITY

The present application is related to U.S. Provisional Patent Application No. 61/294,368, filed Jan. 12, 2010, entitled "METHODS FOR EFFICIENT STATION IDENTIFICATION TO SUPPORT PLURALITY OF APPLICATIONS". Provisional Patent Application No. 61/294,368 is assigned to the assignee of the present application and is hereby incorporated by reference into the present application as if fully set forth herein. The present application hereby claims priority under 35 U.S.C. §119(e) to U.S. Provisional Patent Application No. 61/294,368.

TECHNICAL FIELD OF THE INVENTION

The present application relates generally to wireless communications and, more specifically, to a system and method for efficient station identification that supports a plurality of applications.

BACKGROUND OF THE INVENTION

In 3$^{rd}$ Generation Partnership Project Long Term Evolution (3GPP LTE)) and the IEEE 802.16m Wireless metropolitan area networks (Wireless MAN), Orthogonal Frequency Division Multiplexing (OFDM) is adopted as a downlink (DL) transmission scheme.

SUMMARY OF THE INVENTION

A base station is provided. The base station includes a transmit path circuitry configured to generate a masking sequence to mask a cyclic redundancy check of a control channel information element. The masking sequence includes a 4-bit prefix. The three least significant bits of the 4-bit prefix indicate a message type of the control channel information element.

A method of operating a base station is provided. The method includes generating a masking sequence to mask a cyclic redundancy check of a control channel information element. The mask sequence comprises a 4-bit prefix. The three least significant bits of the 4-bit prefix indicate a message type of the control channel information element.

A subscriber station is provided. The subscriber station includes a receive path circuitry configured to determine a message type of a control channel information element using a three least significant bits of a 4-bit prefix of a masking sequence used to mask a cyclic redundancy check of the control channel information element.

A method of operating a subscriber station is provided. The method includes determining a message type of a control channel information element using a three least significant bits of a 4-bit prefix of a masking sequence used to mask a cyclic redundancy check of the control channel information element.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a table illustrating address space sharing between different types of connections and data transmissions according to an embodiment of this disclosure;

FIG. 5 is a table illustrating masking prefixes along with corresponding masking sequences according to an embodiment of this disclosure;

FIG. 6 is a table used to generate or interpret a mapping sequence according to an embodiment of this disclosure;

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the long term evolution (LTE) term "node B" is another term for "base station" used below. Also, the LTE term "user equipment" or "UE" is another term for "subscriber station" or "mobile station" used below.

Figure 1:
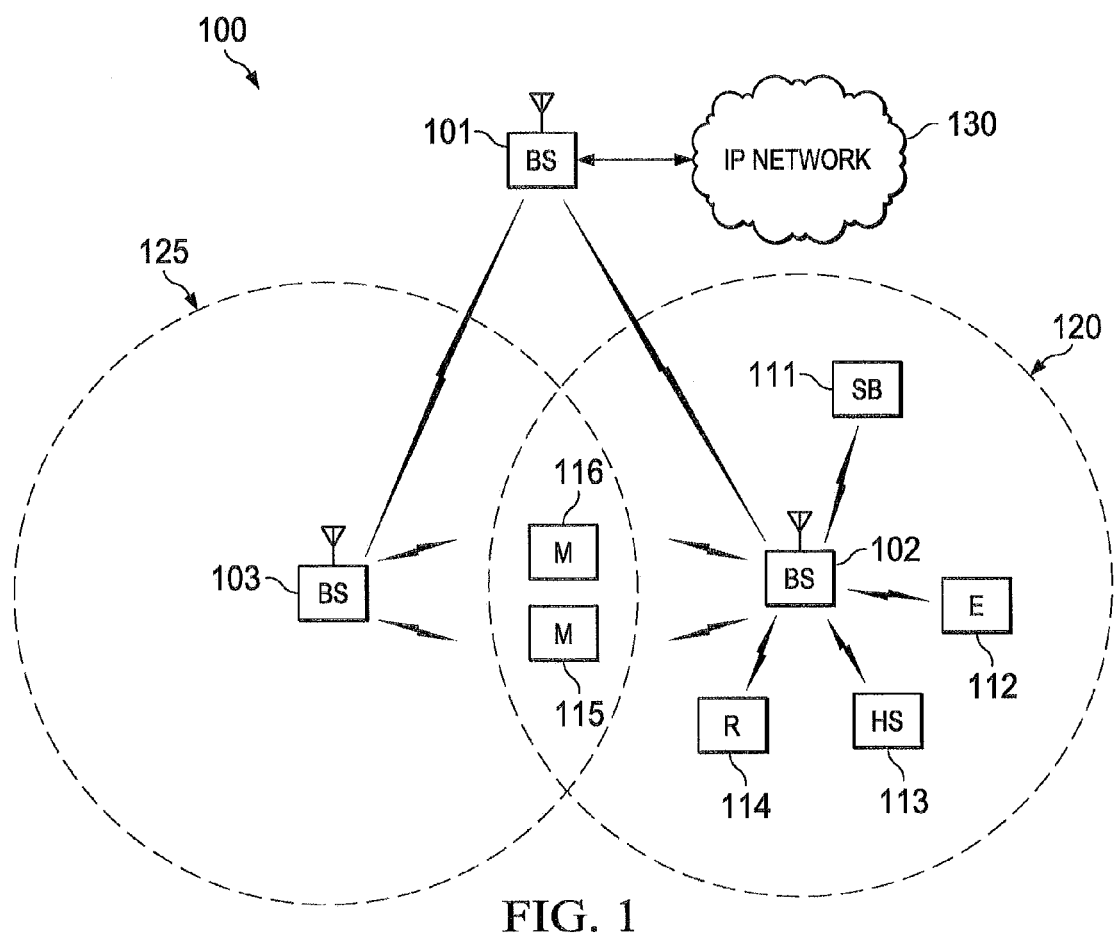
FIG. 1 illustrates an exemplary wireless network that transmits messages in the downlink according to the principles of the disclosure.

FIG. 1 illustrates an exemplary wireless network 100, which transmits messages according to the principles of the present disclosure. In the illustrated embodiment, wireless network 100 includes a base station (BS) 101, a base station (BS) 102, a base station (BS) 103, and other similar base stations (not shown). Base station 101 is in communication with Internet 130 or a similar IP-based network (not shown).

Base station 102 provides wireless broadband access (via base station 101) to Internet 130 to a first plurality of subscriber stations within coverage area 120 of base station 102.

The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
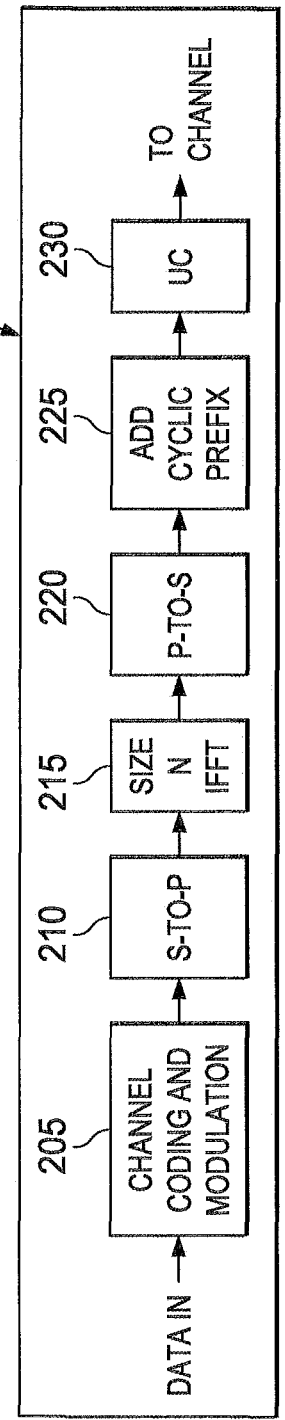
FIG. 2 is a high-level diagram of an OFDMA transmitter according to one embodiment of the present disclosure.
Figure 3:
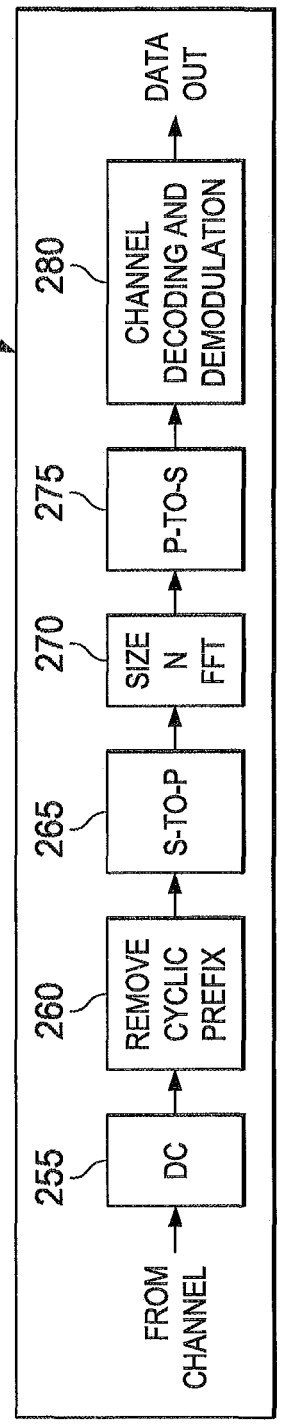
FIG. 3 is a high-level diagram of an OFDMA receiver according to one embodiment of the present disclosure.

FIG. 2 is a high-level diagram of an orthogonal frequency division multiple access (OFDMA) transmit path. FIG. 3 is a high-level diagram of an orthogonal frequency division multiple access (OFDMA) receive path. In FIGS. 2 and 3, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In cellular systems that support packet data communication with multiple subscriber or mobile stations, such as 3GPP LTE-Advanced systems or IEEE 802.16m systems, a mobile station identifier is often transmitted in or with a control channel message or a data packet. The purpose of appending the mobile station identifier to the control channel message or a data packet is to distinguish the transmissions to (or from) a mobile station from the transmissions to (or from) other mobile stations. These types of identifiers are typically referred to as user equipment ID (UE ID) in 3GPP LTE and LTE-Advanced systems, and are typically referred to as a mobile station ID (MSTID) or Group ID in IEEE 802.16m systems. For illustration purposes, such an identifier is simply referred to as an ID in this disclosure. There are different ways to transmit IDs (or sequences) in or with a message, or a segment of a message. For example, an ID (or sequence) can be used to mask (or scramble) a message field of a message or a segment of a message.

Any data transmission to and from the BS and the mobile station (MS) involves error correction and error detection. For error correction and detection, IEEE 802.16m uses convolutional turbo code and cyclic redundancy check (CRC), respectively. For example, a 16-bit CRC is generated based on the contents of a control channel packet referred to as an information element (IE) as follows: Denote the contents of the IE by $m(x)=b_{N-1}x^{N-1}+b_{N-2}x^{N-2}+ \ldots +b_1x+b_0$, where $b_{N-1}$ is the most significant bit (MSB) of the IE and $b_0$ is the least significant bit (LSB) of the IE. The 16-bit CRC is calculated as the remainder of dividing $m(x) \cdot x^{16}$ by the 16-bit CRC generator polynomial $g(x)=x^{16}+x^{12}+x^5+1$. The resulting CRC is denoted by $p(x)=p_{15}x^{15}+p_{14}x^{14}+ \ldots +p_1x+p_0$ where $p_{15}$ is the MSB of the CRC and $p_0$ is the LSB of the CRC.

An MS can subscribe to various offerings from the network like multicast transmission, broadcast TV transmissions and point-to-point transmissions like unicast transmissions. The BS to MS link represents the "last-mile" wireless link in the network. In the case of a multicast transmission, where a group of MSs receives the multicast transmission, a common ID known to all MSs in the group is used to identify the transmission. Examples of such multicast transmissions include group resource allocation (GRA) control channel transmissions, enhanced multicast video transmissions and the like. Examples of a broadcast transmission include broadcast assignment transmissions, non-user specific control channel transmissions, enhanced broadcast video channel transmissions and the like. The multicast and broadcast video service offerings are occasionally grouped together and referred to as enhanced multicast broadcast services (E-MBS). Therefore, in addition to its own ID, which the MS uses to identify its unicast transmissions, the MS may also have multiple group IDs it monitors in order to receive information regarding the transmissions of interest.

FIG. 4 is a table 400 illustrating address space sharing between different types of connections and data transmissions according to an embodiment of this disclosure.

A 12 bit STID can support up to 4096 different IDs. Since the BS supports multiple types of transmissions, like unicast transmissions to a single MS), multicast transmissions to a group of MS, and broadcast transmissions to all MSs, the 4096 IDs have to be shared between the different transmissions. An example of such address space sharing between different types of connections and data transmissions in IEEE 802.16m is shown in the table 400.

The A-AMAP referred to in the table 400 is the advanced Assignment MAP which is the name given to the control channel in IEEE 802.16m.

If the CRC field and the ID have the same length, the masking or scrambling operation can be simply a bit-wise XOR operation between the CRC and the ID. However, the CRC field and the ID may have different length. For example, the CRC field for a control channel information element is 16-bit while the STID is 12-bit in IEEE 802.16m as described, for example, in IEEE P802.16m/D3, Draft Amendment to IEEE Standard for Local and Metropolitan Area Networks, part 16: Air Interface for fixed and mobile broadband wireless access systems, December 2009, which is hereby incorporated by reference into the present application as if fully set forth herein.

In that case, the masking operation may have a few different implementations. For example, one way is to mask 12 bits of the 16-bit CRC with the 12-bit STID. Another way is to append a known 4 bit sequence like 0000 to the 12 bits to make the STID 16 bits and then mask the CRC with the expanded 16-bit STID. Yet another way is to derive a 16-bit mask from the 12-bit STID (possibly with other inputs such as flow ID, Cell ID, etc.) and use the 16-bit mask to mask the 16-bit CRC.

In IEEE 802.16m, as described, for example, in IEEE P802.16m/D3, Draft Amendment to IEEE Standard for Local and Metropolitan Area Networks, part 16: Air Interface for fixed and mobile broadband wireless access systems, December 2009, Table 744 indicates that the 12 bit masked—CRC (MCRC) is prefixed by a 4 bit Masking indicator. If the masking indicator is 0b0000, then the masking is for the 12 bit STID. The 16 bit mask is constructed by prefixing the 12 bit STID with 4 bit masking indicator 0b0000. When the masking indicator is 0b0001, the MCRC is masked by the random access ID (RAID) constructed by concatenating ranging channel preamble index, super-frame number and attempt number. When the masking indicator is 0b0010, the MCRC is masked by the random access ID (RAID) constructed by concatenating bandwidth request channel's preamble index, super-frame number and attempt number. Masking indicators 0b0001 and 0b0010 are used when MSs request bandwidth using either the bandwidth request or the ranging random access channels.

FIG. 5 is a table 500 illustrating masking prefixes along with corresponding masking sequences according to an embodiment of this disclosure.

However, the masking indicator can be designed differently to accommodate different sizes of the RAID as described, for example, in C80216m-09_2988, "Proposed change to RAID and CDMA allocation A-MAP IE (16.2.11.2)", Youngkyo Baek et al., December 2009, which is hereby incorporated by reference into the present application as if fully set forth herein. For example, as shown the table 500 to accommodate a RAID of 15 bits, the masking prefix/indicator is reduced to 1 bit to indicate if a masking ID or a RAID is used. Since a RAID can come from bandwidth request or ranging, the design in the table 500 does not accommodate such distinctions. Therefore, a separate indication must be carried to indicate if the RAID is for bandwidth request or ranging.

Currently, in IEEE 802.16m, it has been proposed to generate a 16 bit masking sequence for the CRC by using the MSB of the masking sequence as a 1 bit masking indicator. The 1 bit masking indicator is used to indicate if the mask is a RAID or not. The 1 bit masking indicator is followed by 3 zeros (known) and a 12 bit multicast station identifier (MS-TID).

FIG. 6 is a table 600 used to generate or interpret a mapping sequence according to an embodiment of this disclosure.

In an embodiment of this disclosure, the 3 zeros that follow the masking indicator in the mask are used to increase the STID space for group ID and E-MBS. For example, as shown in the table 600, if "000" follows a masking indicator of 0, then the subsequent 12 bits of the mask are interpreted to be a unicast StationID. If "001" follows a masking indicator of 0, then the subsequent 12 bits of the mask are interpreted to be a group-ID of GRA. If "010" follows a masking indicator of 0, then the subsequent 12 bits of the mask are interpreted to be an E-MBS STID. Therefore, depending on the connection, the known prefix is determined. In particular embodiments, the BS provides the MS with only the 12 bit ID and the purpose of the ID. Given the purpose and the ID, a unique prefix can be generated by both the MS and BS to be used in the masking and unmasking operation.

For example, the BS in designing the mask of the CRC of a group ID will use $0001b_0b_1b_2 \ldots b_{11}$ as the mask, where $b_0b_1 \ldots b_{11}$ is the assigned group ID. The MS knows the group ID and STID to which the MS belongs. Accordingly, at the receiver, the MS computes the CRC of the received IE and performs an XOR operation with the received CRC to reveal the mask. The MS can then determine if the mask is a unicast STID, group ID or MBS MSTID.

Accordingly, the method and system of this disclosure allows all 4096 addresses to be reserved for unicast transmissions with no additional overhead in signaling. The STIDs are still 12 bits, but the 4-bit prefix will indicate if the STID is a GRA or E-MBS or unicast ID. With three leading bits, 4096 addresses can be reserved for 8 different types of addresses.

In further embodiments, the method and system provided in this disclosure can be used to extend address space by a factor of N, by adding a $\lceil \log_2(N) \rceil$ bit prefix to the existing address space. In the context of constructing a 16 bit mask using a 12 bit STID, the address space can be extended by 4096*16, using 4 bits of the masking prefix.

In some embodiments, if "0b000" follows a masking indicator of 0, then the 12 bit STID indicates unicast transmissions. If "0b111" follows a masking indicator of 0, then the 12 bit STID indicates the space of addresses of multicast E-MBS connections. The 3 bit-tuple, following the masking indicator, starting from 001 to 110 can be used to indicate multiple segments of the group ID message. In particular embodiments, the receiver and transmitter have a common knowledge of the message structure in terms of the fields in the message, their placement, and their interpretation. For example, a base station transmits a group message A segmented to two segments. The message is intended for a group of mobile stations Group ID being ID_A. ID_A is 12-bit. A 16-bit CRC is generated for each segment of the message. A first 16-bit scrambling (or masking) sequence is generated for the CRC of the first segment of Message A by appending a 1 bit masking indicator followed by a 3-bit segment identifier '001' to the 12-bit ID_A. The 16-bit CRC of the first segment of Message A is then scrambled (or masked) by the first scrambling sequence. Likewise, a second 16-bit scrambling (or masking) sequence is generated for the CRC of the second segment of Message A by appending a 1 bit masking indicator followed by a 3-bit segment identifier '010' to the 12-bit ID_A. The 16-bit CRC of the second segment of Message A is then scrambled (or masked) by the second scrambling sequence. Proceeding in this fashion, up to six segments of the group ID message can be indexed using this approach with no additional overhead in signaling.

In further embodiments, the masking sequence for a RAID can be constructed. The 1 bit masking indicator is followed by a 1 bit channel indicator that indicates whether the request originated from a bandwidth request (BW REQ) or a ranging channel. Following the masking and channel indicators, a 14 bit RAID is constructed with the attributes (i.e., superframe number (LSB 4 bits), frame_index (2 bits), ranging preamble code/BW REQ preamble code index (6 bits) and opportunity index (2 bits)) as defined in Equation 1 below:

$$RA\text{-}ID = (LSB\ 4\ bits\ of\ superframe\ number | frame\_index | preamble\_code\_index. \quad [Eqn.\ 1]$$

The 16 bit masking sequence, therefore, comprises a 1 bit masking indicator set to 1, a 1 bit channel indicator to indicate whether the preamble is a ranging code or a BWREQ preamble, and 14 bit RAID.

Figure 7:
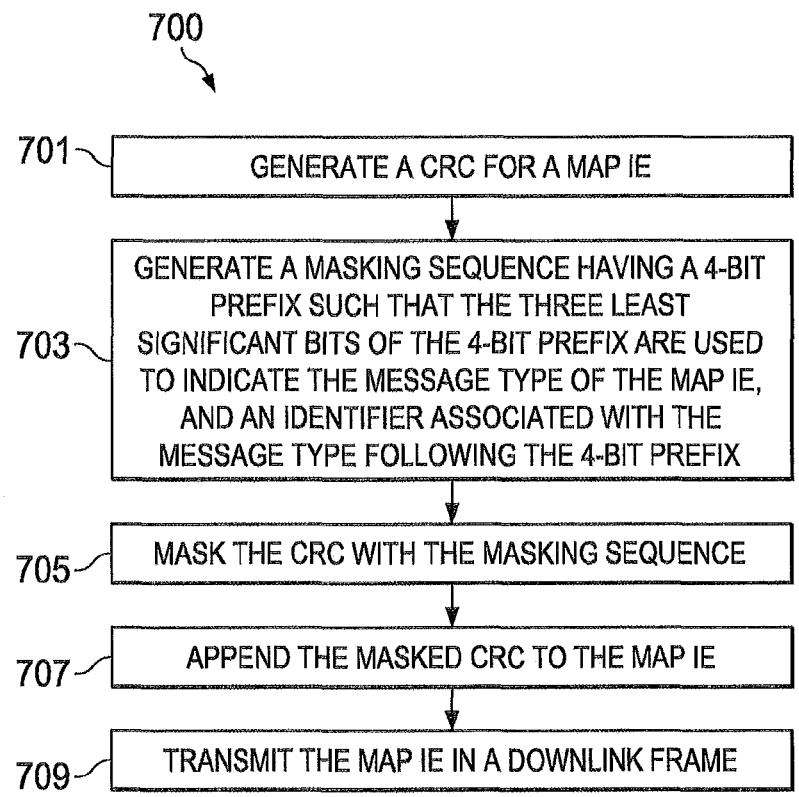
FIG. 7 illustrates a method of operating a base station according to an embodiment of this disclosure.

FIG. 7 illustrates a method 700 of operating a base station according to an embodiment of this disclosure.

As shown in FIG. 7, the method 700 includes generating a CRC for a MAP IE (block 701). The method 700 also includes generating a masking sequence having a 4-bit prefix such that the three least significant bits of the 4-bit prefix are used to indicate the message type of the MAP IE, and an identifier associated with the message type following the 4-bit prefix (block 703). The method 700 further includes masking the CRC with the masking sequence (block 705) and appending the masked CRC to the MAP IE (block 707). The method 700 also includes transmitting the MAP IE in a downlink frame (block 709).

Figure 8:
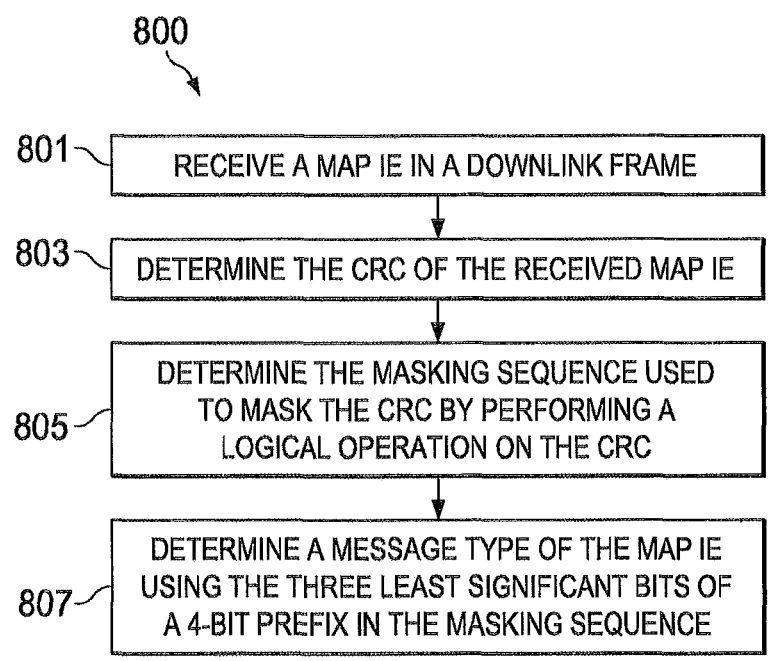
FIG. 8 illustrates a method of operating a subscriber station according to an embodiment of this disclosure.

FIG. 8 illustrates a method 800 of operating a subscriber station according to an embodiment of this disclosure.

As shown in FIG. 8, the method 800 includes receiving a MAP IE in a downlink frame (block 801). The method 800 also includes determining the CRC of the received MAP IE (block 803) and determining the masking sequence used to mask the CRC by performing a logical operation on the CRC (block 805). The method 800 also includes determining a message type of the MAP IE using the 3 least significant bits of a 4-bit prefix in the masking sequence (block 807).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station comprising:
a transmit path circuitry configured to generate a masking sequence to mask a cyclic redundancy check of a control channel information element, the mask sequence comprising a 4-bit prefix,
wherein the three least significant bits of the 4-bit prefix indicate a transmission type of the control channel information element and the masking sequence further comprises an identifier associated with the transmission type,
wherein when the identifier is a unicast StationID, then the three least significant bits have a first value,
wherein when the identifier is a group-ID of a group resource allocation, then the three least significant bits have a second value different from the first value, and
wherein when the identifier is a group-ID of an enhanced multicast broadcast services station ID (E-MBS STID), then the three least significant bits have a third value different from the first value and the second value.

2. The base station in accordance with claim 1 wherein the three least significant bits of the 4-bit prefix also indicate multiple segments of a group ID message.

3. The base station in accordance with claim 1 wherein the transmit path circuitry is further configured to:
mask a cyclic redundancy check of the control channel information element with the masking sequence;
append the masked cyclic redundancy check to the control channel information element; and
transmit the control channel information element in a downlink frame.

4. A method of operating a base station, the method comprising:
generating a masking sequence to mask a cyclic redundancy check of a control channel information element, the mask sequence comprising a 4-bit prefix,
wherein the three least significant bits of the 4-bit prefix indicate a transmission type of the control channel information element and the masking sequence further comprises an identifier associated with the transmission type, wherein when the identifier is a unicast StationID, then the three least significant bits have a first value, wherein when the identifier is a group-ID of a group resource allocation, then the three least significant bits have a second value different from the first value, and wherein when the identifier is a group-ID of an enhanced multicast broadcast services station ID (E-MBS STID), then the three least significant bits have a third value different from the first value and the second value.

5. The method in accordance with claim 4 wherein the three least significant bits of the 4-bit prefix also indicate multiple segments of a group ID message.

6. The method in accordance with claim 4 further comprising:

masking a cyclic redundancy check of the control channel information element with the masking sequence;

appending the masked cyclic redundancy check to the control channel information element; and transmitting the control channel information element in a downlink frame.

7. A subscriber station comprising:

a receive path circuitry configured to determine a transmission type of a control channel information element using a three least significant bits of a 4-bit prefix of a masking sequence used to mask a cyclic redundancy check of the control channel information element, wherein the masking sequence further comprises an identifier associated with the transmission type, wherein when the three least significant bits have a first value, then the network nodes determines that the identifier is a unicast StationID, wherein when the three least significant bits have a second value, then the network nodes determines that the identifier is a group-ID of a group resource allocation, and wherein when the three least significant bits have a third value, then the network nodes determines that the identifier is a group-ID of an enhanced multicast broadcast services station ID (E-MBS STID).

8. The subscriber station in accordance with claim 7 wherein the receive path circuitry is configured to identify segments of a group ID message using the three least significant bits.

9. The subscriber station in accordance with claim 7 wherein a most significant bit of the 4-bit prefix is a 1 bit masking indicator that indicates if the mask is a random access ID.

10. A method of operating a subscriber station, the method comprising:

determining a transmission type of a control channel information element using a three least significant bits of a 4-bit prefix of a masking sequence used to mask a cyclic redundancy check of the control channel information element, wherein the masking sequence further comprises an identifier associated with the transmission type, when the three least significant bits have a first value, determining that the identifier is a unicast StationID, when the three least significant bits have a second value, determining that the identifier is a group-ID of a group resource allocation, and when the three least significant bits have a third value, determining that the identifier is a group-ID of an enhanced multicast broadcast services station ID (E-MBS STID).

11. The method in accordance with claim 10 further comprising identifying segments of a group ID message using the three least significant bits.

12. The method in accordance with claim 10 wherein a most significant bit of the 4-bit prefix is a 1 bit masking indicator that indicates if the mask is a random access ID.

* * * * *